(12) United States Patent
Sakuraba

(10) Patent No.: US 8,111,410 B2
(45) Date of Patent: Feb. 7, 2012

(54) DATA PROCESSING APPARATUS, AND COMPUTER READABLE RECORDING MEDIUM STORED WITH PROCESSING PROGRAM

(75) Inventor: Tamotsu Sakuraba, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 574 days.

(21) Appl. No.: 12/267,626

(22) Filed: Nov. 10, 2008

(65) Prior Publication Data

US 2009/0153891 A1 Jun. 18, 2009

(30) Foreign Application Priority Data

Nov. 15, 2007 (JP) ................. 2007-297292

(51) Int. Cl.
G06K 15/00 (2006.01)
G06K 1/00 (2006.01)
G06F 15/00 (2006.01)
(52) U.S. Cl. ............. 358/1.12; 358/1.18; 358/1.9
(58) Field of Classification Search .................. None
See application file for complete search history.

(56) References Cited

U.S. PATENT DOCUMENTS

| 7,516,162 | B2 | 4/2009 | Mochizuki | |
|---|---|---|---|---|
| 2001/0044868 | A1* | 11/2001 | Roztocil et al. | 710/129 |
| 2003/0026626 | A1 | 2/2003 | Sunada et al. | |
| 2003/0070146 | A1* | 4/2003 | Sato et al. | 715/525 |
| 2003/0197882 | A1* | 10/2003 | Tsukuba et al. | 358/1.12 |
| 2006/0001720 | A1* | 1/2006 | Yamamura | 347/101 |
| 2006/0045596 | A1* | 3/2006 | Tischler | 400/76 |
| 2006/0106830 | A1* | 5/2006 | Mochizuki | 707/100 |

FOREIGN PATENT DOCUMENTS

| JP | 2003-034062 A | 2/2003 |
|---|---|---|
| JP | 2005-134798 A | 5/2005 |
| JP | 2006-139611 A | 6/2006 |
| JP | 2006-293877 A | 10/2006 |
| JP | 2007-087043 A | 4/2007 |

OTHER PUBLICATIONS

Notification of Reason for Refusal, Japanese Application No. 2007-297292, dated Sep. 29, 2009.

* cited by examiner

*Primary Examiner* — King Poon
*Assistant Examiner* — Ming Hon
(74) *Attorney, Agent, or Firm* — Buchanan Ingersoll & Rooney PC

(57) ABSTRACT

In merging the printing data of the merger source to the printing data of the merger destination, the setting information concerning the tab sheets are identified from the both printing data and the aligning process is executed for aligning the tab setting information of the both printing data. For example, the tab positions are changed and aligned in such a way that the tab positions vary sequentially from the start side of pages.

15 Claims, 18 Drawing Sheets

FIG.6
(A)
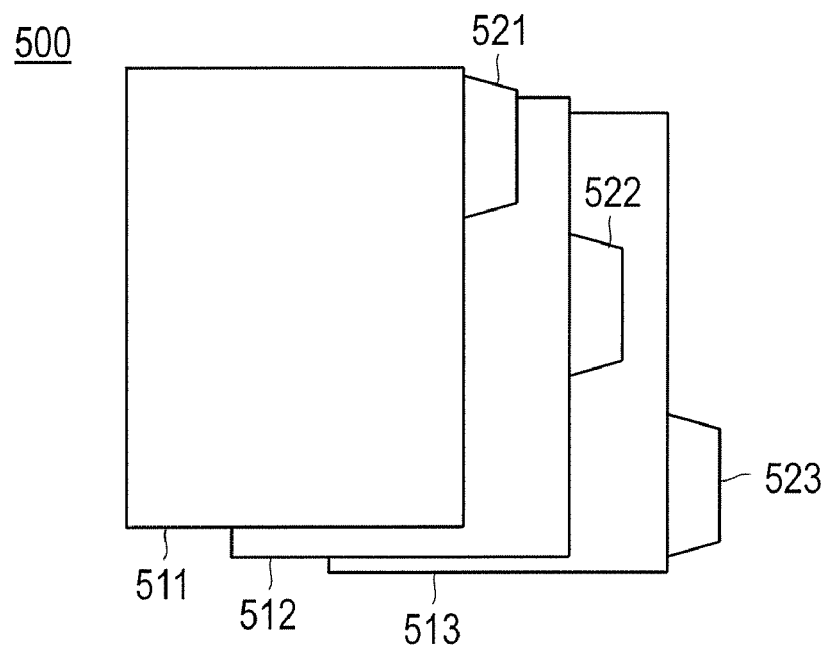
(B)
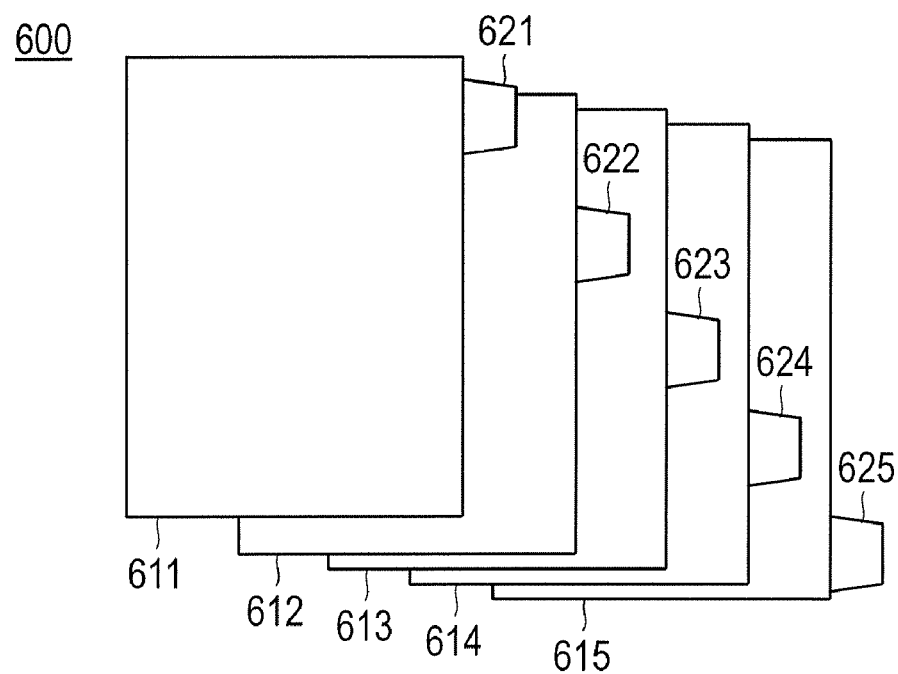

| Tab | A4 Tab |
|---|---|
| Page | 2, 5, 7 |
| Number of Tab | 5 |
| Tab Position | 1/5, 2/5, 3/5 |
| Font(Type Face) | Arial |
| Size | 10 |
| Style | Bold |
| Character Color | Black |
| Character Position | Center |
| Character Direction | Horizontal |
| Tray | Tray 2 |

FIG.15
720

| Tab | A4 Tab |
|---|---|
| Page | 3, 8, 9 |
| Number of Tab | 5 |
| Tab Position | 1/5, 2/5, 3/5 |
| Font(Type Face) | Arial |
| Size | 10 |
| Style | Bold |
| Character Color | Black |
| Character Position | Center |
| Character Direction | Horizontal |
| Tray | Tray 2 |

Merger of printing data

Do you want tab positions to be aligned?

Yes    No

| Tab | A4 Tab |
|---|---|
| Page | 2, 5, 7, 12, 17, 18 |
| Number of Tab | 5 |
| Tab Position | 1/5, 2/5, 3/5, 4/5, 5/5, 1/5 |
| Font(Type Face) | Arial |
| Size | 10 |
| Style | Bold |
| Character Color | Black |
| Character Position | Center |
| Character Direction | Horizontal |
| Tray | Tray 2 |

| Tab | Letter Tab |
|---|---|
| Page | 3, 8, 9 |
| Number of Tab | 3 |
| Tab Position | 1/3, 2/3, 3/3 |
| Font(Type Face) | Arial |
| Size | 10 |
| Style | Bold |
| Character Color | Black |
| Character Position | Center |
| Character Direction | Horizontal |
| Tray | Tray 2 |

| Tab | A4 Tab | Letter Tab |
|---|---|---|
| Page | 2,5,7 | 12, 17, 18 |
| Number of Tab | 5 | 3 |
| Tab Position | 1/5, 2/5, 3/5 | 1/3, 2/3, 3/3 |
| Font(Type Face) | Arial | Arial |
| Size | 10 | 10 |
| Style | Bold | Bold |
| Character Color | Black | Black |
| Character Position | Center | Center |
| Character Direction | Horizontal | Horizontal |
| Tray | Tray 2 | Tray 2 |

Merger of printing data

Do you want standardization of tab types?

[ Yes ]    [ No ]

Merger of printing data

Do you want to standardize tab types to match with tab type of merger destination?

[ Yes ]    [ No ]

| Tab | A4 Tab |
|---|---|
| Page | 3, 8, 9 |
| Number of Tab | 5 |
| Tab Position | 1/5, 2/5, 3/5 |
| Font(Type Face) | Tahoma |
| Size | 12 |
| Style | Normal |
| Character Color | Black |
| Character Position | Center |
| Character Direction | Normal |
| Tray | Tray 3 |

Merger of printing data

Do you want standardization of tab character setting information?

Yes    No

650

Merger of printing data

Do you want to standardize tab character setting information to match with that of merger destination?

Yes   No

732

| Tab | A4 Tab |
|---|---|
| Page | 2, 5, 7, 12, 17, 18 |
| Number of Tab | 5 |
| Tab Position | 1/5, 2/5, 3/5, 1/5, 2/5, 3/5 |
| Font(Type Face) | Arial |
| Size | 10 |
| Style | Bold |
| Character Color | Black |
| Character Position | Center |
| Character Direction | Horizontal |
| Tray | Tray 2 |

DATA PROCESSING APPARATUS, AND COMPUTER READABLE RECORDING MEDIUM STORED WITH PROCESSING PROGRAM

CROSS-REFERENCE TO RELATED APPLICATION

This application is based on Japanese Patent Application No. 2007-297292 filed on Nov. 15, 2007, the contents of which are incorporated herein by reference.

BACKGROUND

1. Technical Field

The present invention relates to a data processing apparatus, and a computer readable recording medium stored with an image processing program. The present invention particularly relates to a data processing apparatus, and a computer readable recording medium stored with a data processing program used for merging a plurality of printing data.

2. Description of Related Art

An art is known for accumulating processed printing jobs (printing data) for which printing processes have been completed in a memory unit such as a hard disk so that they can be edited or processed later.

According to such an art, it is possible, for example, to merge a plurality of printing data stored in the memory unit. Moreover, because of its product structure, a serial number is assigned to each page of the printing data after the plurality of printing data is merged in the particular art.

On the other hand, there has been no consideration for the merger of printing data containing tab pages, which are tab sheet pages.

SUMMARY

The present invention is made in consideration of the problem that the above-mentioned related art had, and an object of the present invention is to provide a data processing apparatus, and a computer readable recording medium stored with an image processing program capable of merging a plurality of printing data each containing tab pages, and generating merged printing data suitable for outputting good-looking printed items.

Another object of the present invention is to provide a data processing apparatus, and a computer readable recording medium stored with an image processing program capable of merging a plurality of printing data that does not require resetting concerning tab sheets in merging a plurality of printing data each containing tab pages for generating merged printing data suitable for outputting good-looking printed items.

To achieve at least one of the abovementioned objects, a data processing apparatus reflecting one aspect of the present invention comprises: a merger instructing part for receiving a user's instruction for merger of first printing data with second printing data; an identifying part for identifying first tab setting information and second tab setting information, which are setting information concerning tab sheets, from said first printing data and said second printing data respectively, which are instructed to be merged via said merger instructing part; and an alignment processing part for processing alignment of said first tab setting information and said second tab setting information which are identified by said identifying part.

It is preferable that said first tab setting information and said second tab setting information include setting information concerning tab positions that indicate tab positions of tab sheets; and said alignment processing part changes tab positions in such a way that the tab positions vary sequentially from the start side of pages, when said first printing data and said second printing data are merged.

It is preferable that the data processing apparatus further comprises an alignment instructing part for receiving a user's instruction as to whether said alignment processing is to be executed or not, and said alignment processing part changes tab positions in such a way that said tab positions vary sequentially from the start side of pages, when an instruction is received from said alignment instructing part for executing said alignment process.

It is preferable that said alignment instructing part receives user's instruction as to whether said alignment process is to be conducted or not, when tab sheet types of said first printing data and said second printing data are identical.

It is preferable that the data processing apparatus further comprises a tab type standardization instructing part for receiving a user's instruction for standardizing tab sheet types when the tab sheet types of said first printing data and said second printing data are different; and said alignment processing part changes tab positions in such a way that said tab positions vary sequentially from the start side of pages, when a user's instruction is received from said tab type standardization instructing part for executing said alignment process.

It is preferable that the data processing apparatus further comprises a tab type selecting part for receiving a user's selection as to which of the tab sheet types, the tab sheet type of said first printing data or the tab sheet type of said second printing data, is to be used, when a user's instruction is received from said tab type standardization instructing part for standardizing the tab sheet type.

It is preferable that between said first printing data and said second printing data, the setting information of the sheet supply tray, in which the tab sheet type that was not selected via said tab sheet selecting part is set up, is modified to conform to the setting information of the sheet supply tray, in which the tab sheet type that was selected via said tab sheet selecting part is set up.

It is preferable that said first tab setting information and said second tab setting information include setting information concerning tab character setting information concerning characters to be printed on the tabs of the tab sheets; and said alignment processing part standardizes the tab character setting information in said first printing data and the tab character setting information in said second printing data to either one of them.

It is preferable that the data processing apparatus further comprises a tab character standardization instructing part for receiving a user's instruction for standardizing tab character setting information when the tab character setting information of said first printing data and said second printing data are different; and said standardization processing part standardizes the tab character setting information in said first printing data and the tab character setting information in said second printing data to either one of them, when a user's instruction is received from said tab character standardization instructing part for standardizing the tab character setting information.

It is preferable that the data processing apparatus further comprises a tab character selecting part for receiving a user's selection as to which of the tab character setting information, the tab character setting information of said first printing data or the tab character setting information of said second printing data, is to be used as the standard, when a user's instruction is received from said tab character standardization instructing part for standardizing the tab character setting information.

It is preferable that said tab character setting information includes setting information concerning fonts of characters to be printed on the tabs of the tab sheets.

It is preferable that said tab character setting information includes setting information concerning positions of characters to be printed on the tabs of the tab sheets.

It is preferable that said alignment processing part changes the second tab setting information to match the first tab setting information, when said second printing data, which is a merger source, is merged to said first printing data, which is a merger destination.

It is preferable that said alignment processing part changes the second tab setting information to match the first tab setting information, when said first printing data is stored for a printer with a higher priority of use for outputs among a plurality of printers clustered and said second printing data is stored for a printer with a lower priority of use for outputs among a plurality of printers clustered.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a diagram showing an example of a tab sheet.

FIG. 14 is an example of merger destination attachment table, which is an attachment table concerning printing data of merger destination.

FIG. 15 is an example of merger source attachment table, which is an attachment table concerning printing data of merger sources.

FIG. 16 is a diagram showing an example of a confirmation dialog.

FIG. 17 is an example of post-merger attachment table, which is an attachment table concerning post-merger printing data.

FIG. 18 is another example of merger source attachment table, which is an attachment table concerning printing data of merger sources.

FIG. 19 is another example of post-merger attachment table, which is an attachment table concerning post-merger printing data.

FIG. 21 is a diagram showing an example of a confirmation dialog.

FIG. 22 is a diagram showing an example of a confirmation dialog.

FIG. 24 shows an example of the merger source attachment table.

FIG. 25 is a diagram showing an example of a confirmation dialog.

DETAILED DESCRIPTION

The preferred embodiments of the invention will be described in detail below with reference to the accompanying drawings.

Figure 1:
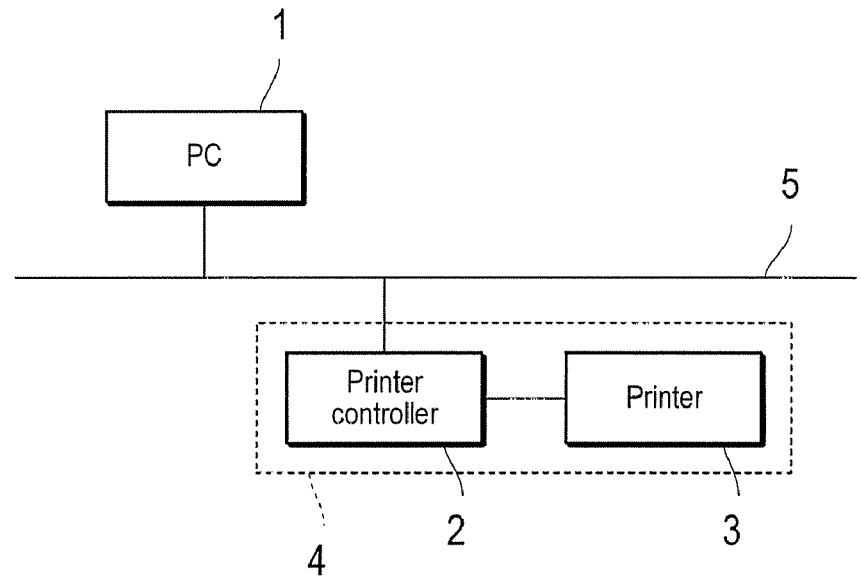
FIG. 1 is a block diagram showing the overall constitution of an image forming system according to a first embodiment of the present invention.

FIG. 1 is a block diagram showing the overall constitution of an image forming system according to a first embodiment of the present invention.

The image forming system according to the present embodiment is equipped with a PC1 as a printing setting apparatus for executing setup and instructions concerning printing and an image forming apparatus 4 for executing printing process in accordance with information set up by the PC 1, which are communicably connected with each other via a network 5. Also, the PC 1 and the image forming apparatus 4 can be connected directly (local connection) without recourse to the network 5.

The image forming apparatus 4 as a data processing apparatus consists of a printer controller 2 and a printer 3 as an image forming apparatus, which are locally connected with each other. This local connection can be accomplished by means of various local connection interfaces, such as serial interfaces, e.g., USB and IEEE 1394, parallel interfaces, e.g., SCSI and IEEE 1284, wireless communication interfaces, e.g., Bluetooth®, IEEE802.11, HomeRF®, IrDA®, etc. However, the printer controller 2 and the printer 3 can be connected via the network 5.

Figure 2:
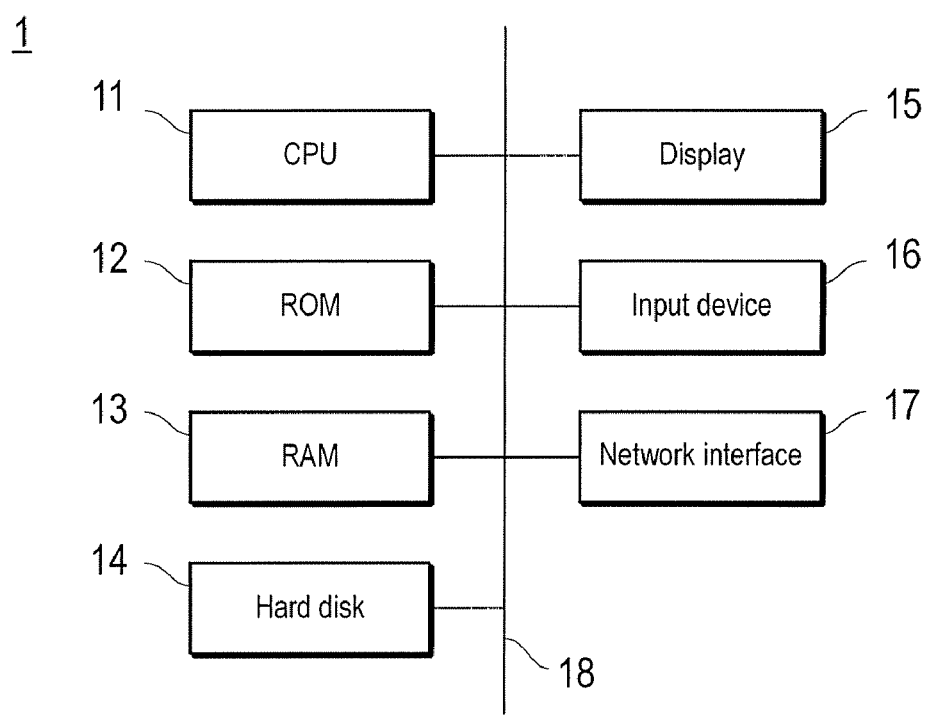
FIG. 2 is a block diagram showing the constitution of the PC shown in FIG. 1.

FIG. 2 is a block diagram showing the constitution of PC 1 shown in FIG. 1.

The PC 1 contains a CPU 11, a ROM 12, a RAM 13, a hard disk 14, a display 15, an input apparatus 16 and a network interface 17, all of which are interconnected via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

An application program for generating document files and a printer driver for converting the document files into PDL data described in a Page Description Language ("PDL") understood by the printer controller 2 are installed on the hard disk 14.

The display 15 can be LCD, CRT, and other displays, on which various kinds of information are displayed. The input device 16 includes a pointing device such as a mouse, a keyboard, and others, and is used for executing various kinds of information inputs.

The network interface 17 is an interface for communicating with other equipment on the network via the network 5 using standards such as Ethernet®, Token Ring, FDDI, etc.

Figure 3:
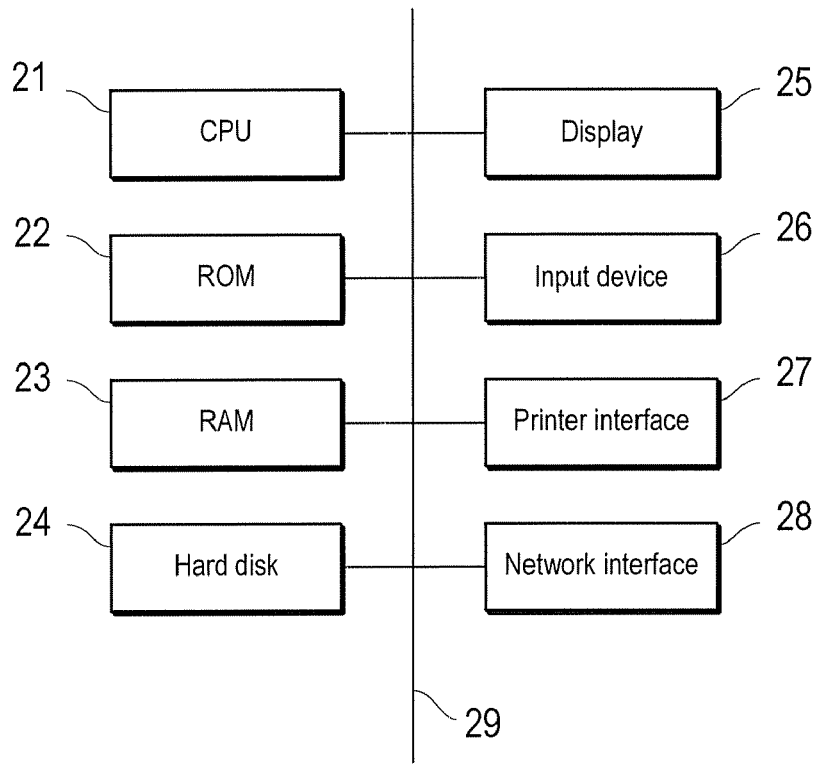
FIG. 3 is a block diagram showing the constitution of a printer controller of the image forming apparatus shown in FIG. 1.

FIG. 3 is a block diagram showing the constitution of a printer controller 2 of the image forming apparatus 4 shown in FIG. 1.

The printer controller 2 is provided with a CPU 21, a ROM 22, a RAM 23, a hard disk 24, a display 25, an input device 26, a printer interface 27, and a network interface 28, all of which are interconnected with each other via a bus 29 for exchanging signals. The descriptions of those parts of the printer controller 2 that have the same functions as those of the corresponding parts of the PC 1 will be omitted here to avoid being duplicative.

The memory unit such as the hard disk 24 stores a program for generating image data of the bitmap format by translating the PDL data received from PC1, and a program for editing or fabricating image data of the bitmap format stored as printing data.

The printer interface 27 is an interface for communicating with the locally connected printer 3.

Figure 4:
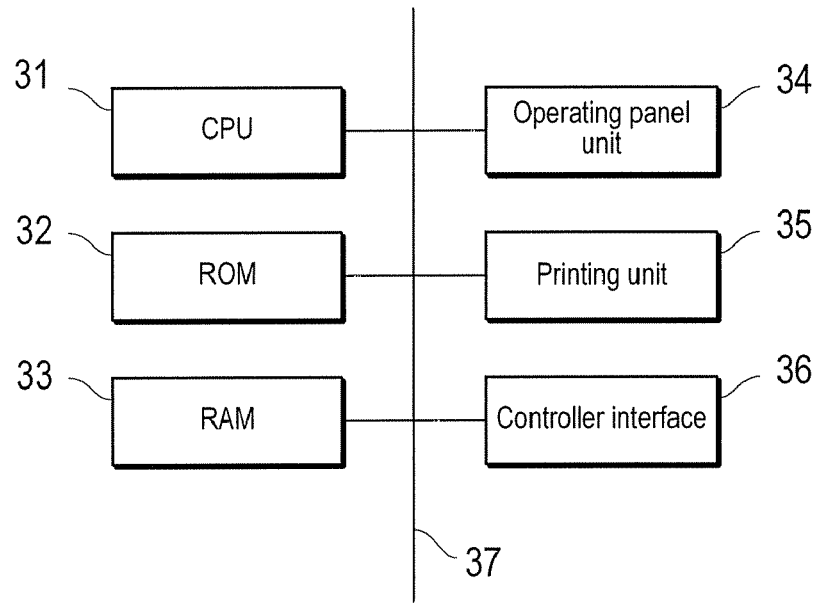
FIG. 4 is a block diagram showing the constitution of a printer of the image forming apparatus shown in FIG. 1.

FIG. 4 is a block diagram showing the constitution of the printer 3 of the image forming apparatus 4 shown in FIG. 1. The printer 3 has a CPU 31, a ROM 32, a RAM 33, an operating panel 34, a printing unit 35, and a controller interface 36, all of which are interconnected with each other via a bus 37 for exchanging signals. The descriptions of those parts of the printer 3 that have the same functions as those of the corresponding parts of the PC 1 will be omitted here to avoid being duplicative.

The ROM 32 stores a printing process program to be executed based on image data received from the printer controller 2.

The operating panel unit 34 is equipped with a touch panel, a ten-key pad, a start button, a stop button and others to be used for displaying various data and entering various instructions.

The printing unit 35 prints images based on image data received from the printer controller 2 using a publicly known image process such as the electronic photography process on recording media such as paper.

The controller interface 36 is an interface for communicating with the locally connected printer controller 2.

Figure 5:
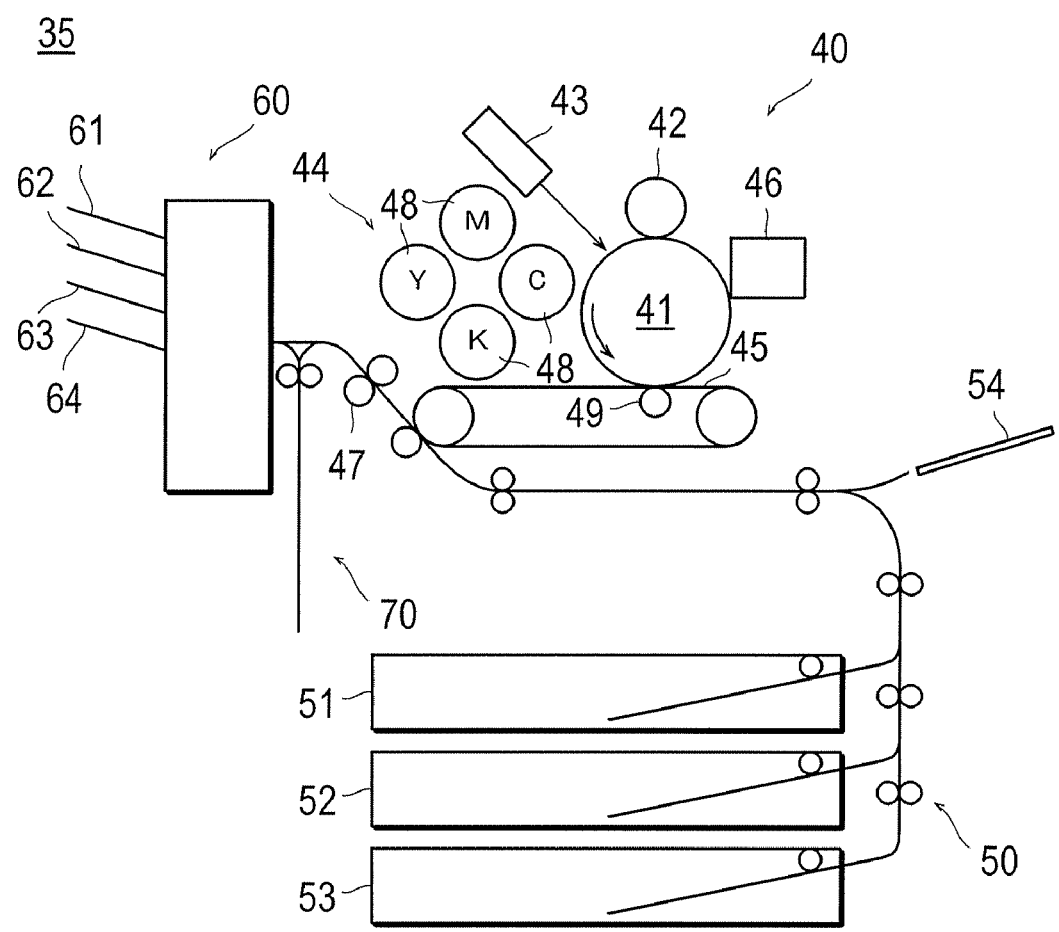
FIG. 5 is a diagram showing the typical constitution of a printing unit.

FIG. 5 is a diagram showing the typical constitution of a printing unit 35.

The printing unit 35 has a paper supply unit 50 for supplying recording media such as printing paper and insertion sheets such as tab sheets, an image forming unit 40 for forming images on the recording media, and a paper discharge unit 60 for discharging printing paper and tab sheets. The printing unit 35 also has a reversing mechanism unit 70 for reversing the front and back sides of printing paper.

The image forming unit 40 of the printing unit 35 has a sensitizer drum 41 that rotates in the arrow direction, a charging device 42, an exposing device 43, a developing device 44, an intermediate transfer belt 45, a cleaning device 46, and a fixing device 47. After the surface of the sensitizer drum 41 is evenly charged by means of the charging device 42, an electrostatic latent image is formed on the surface of the sensitizer drum 41 as it is irradiated with laser beams by the exposing device 43. The electrostatic latent image becomes an apparent image as the toner adheres to the electrostatic latent image on the sensitizer drum 41 in accordance with a quarter turn of the sensitizer drum 41. The developing device 44 has a developing controller 48 for each of the colors, cyan (C), magenta (M), yellow (Y), and black (K) respectively, and developed toner images of these colors are transported to the transfer unit 49, then onto the intermediate transfer belt 45, and overlaid on top of each other there, so that the overlaid color image can be transferred to the printing paper supplied from the paper supply unit 50. The toner images are then fixed on the printing paper by the fixing device 47 and transported to the paper discharge unit 60.

The paper supply unit 50 has a plurality of sheet supply trays 51-54. The sheet supply tray 54 is a manual feed sheet supply tray. The paper discharge unit 60 is equipped with a plurality of paper discharge trays 61-64. The paper discharge unit 60 may have a post-processing part for providing post-processes such as punching or stapling to the printing paper transported there.

FIG. 6 shows an example of the tab sheet, wherein (A) showing a three tab sheet 500 and (B) showing a five tab sheet 600. Tab sheets are also called index sheets. As shown in FIG. 6 (A), the tab sheet 500 is a set consisting of three sheets 511-513 and is called a "three-tab." Each of the tab sheets 511-513 has a flat rectangular main body and a tab 521-531 respectively protruding at a specified position on a side of said may body. As shown in FIG. 6 (B), the tab sheet 600 is a set consisting of five sheets 611-615 and is called a "five-tab." Each of the tab sheets 611-615 has a flat rectangular main body and a tab 621-625 respectively protruding at a specified position on a side of said may body.

The order of the tab sheets shown in FIG. 6 is called the normal order and is arranged in such a way that the tab of an upper layer sheet is found above the tab of a lower layer sheet in FIG. 6 when all of their tabs are on the right side. In case of the three-tab tab sheet 500, the tabs 521-523 are provided on one side of the main body lowering their positions sequentially in three steps from the top to the bottom. The positions of the tabs 521, 522, and 523 are identified as "⅓," "⅔," and "³⁄₃" respectively. In case of the five-tab tab sheet 600, the tabs 621-625 are provided on one side of the main body lowering their positions sequentially in five steps from the top to the bottom. The positions of the tabs 621, 622, 623, 624, and 625 are identified as "⅕" (one-fifth), "⅖" (two-fifths), "⅗" (three-fifths), ⅘ (four-fifths), and "⅘" (five-fifths) respectively. In other words, the tab position means the position of the tab on the tab sheet. The tab sheets 500 and 600 are normally provided in multiple sets in the sheet supply tray.

Several kinds of tab sheets with different sizes can be prepared as well. For example, A4 size tab sheets as well as letter size tab sheets can be used.

The PC 1, the printer controller 2, and the printer 3 can each contain constitutional elements other than those described above, or may lack a portion of the abovementioned elements.

The operation of the image forming system in this embodiment will be described in the following. The outline of the printing process in the image forming system according to the present embodiment is as follows:

First, as the user turns on the printer driver of the PC 1 in order execute printing based on a specified document, the PC 1 displays a printing setting screen (not shown) on the display 15 for the user to set up the printing. Next, after receiving the setting as specified by the user's operation on the printing setting screen, the PC 1 receives the user's printing instructions. As it receives the printing instructions, the PC 1 converts the document file into PDL data and transmits it to the image forming apparatus 4. The printer controller 2 of the image forming apparatus 4 translates the PDL data received from the PC 1 to generate the image data of the bitmap format, and transfer the particular image data to the printer 3 of the image forming apparatus 4. The printer 3 prints image based on the received image data on the specified paper.

Next, the case of editing the stored printing data and executing the printing process while inserting the tab sheets will be described below.

As described above, the printer controller 2 generates the image data of the bitmap format. The printer controller 2 stores the generated image data of the bitmap format as printing data (also called "printing job") in the memory unit such as the hard disk 24. The case of editing the stored printing data by inserting the tab pages will be discussed below. It is possible to have the tab pages included in the PDL data and to have the tab pages to be included in the printing data in advance when the printing data, which is the image data of the bitmap format, is generated from the PDL data.

First, as the user starts up the application software installed in the printer controller 2, a list of printing data stored in the memory unit such as the hard disk 24 is displayed on the display 25.

Figure 7:
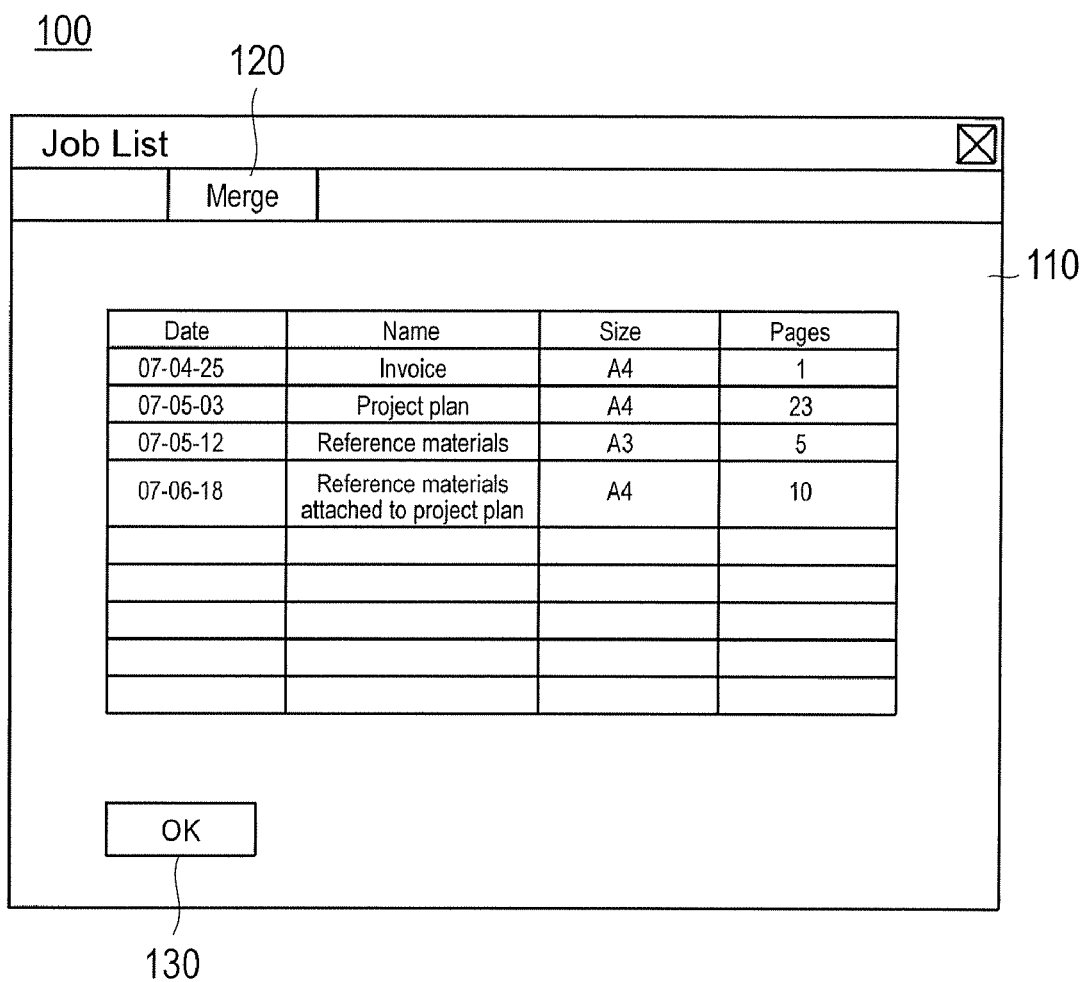
FIG. 7 is a diagram showing an example of a job list indicating a list of printing data.

FIG. 7 is a diagram showing an example of a job list indicating a list of printing data.

A job list 100 has a printing data selection part 110 on which a plurality of printing data is displayed for the user to select, and a merging button 120 to receive the user's merging instruction to merge the selected printing data. According to this application software, the user can check the printing data of each page in the thumbnail format of a low resolution. When a portion of the printing data on the printing data selection part 110 is double clicked, a preview screen appears on the display 25.

Figure 8:
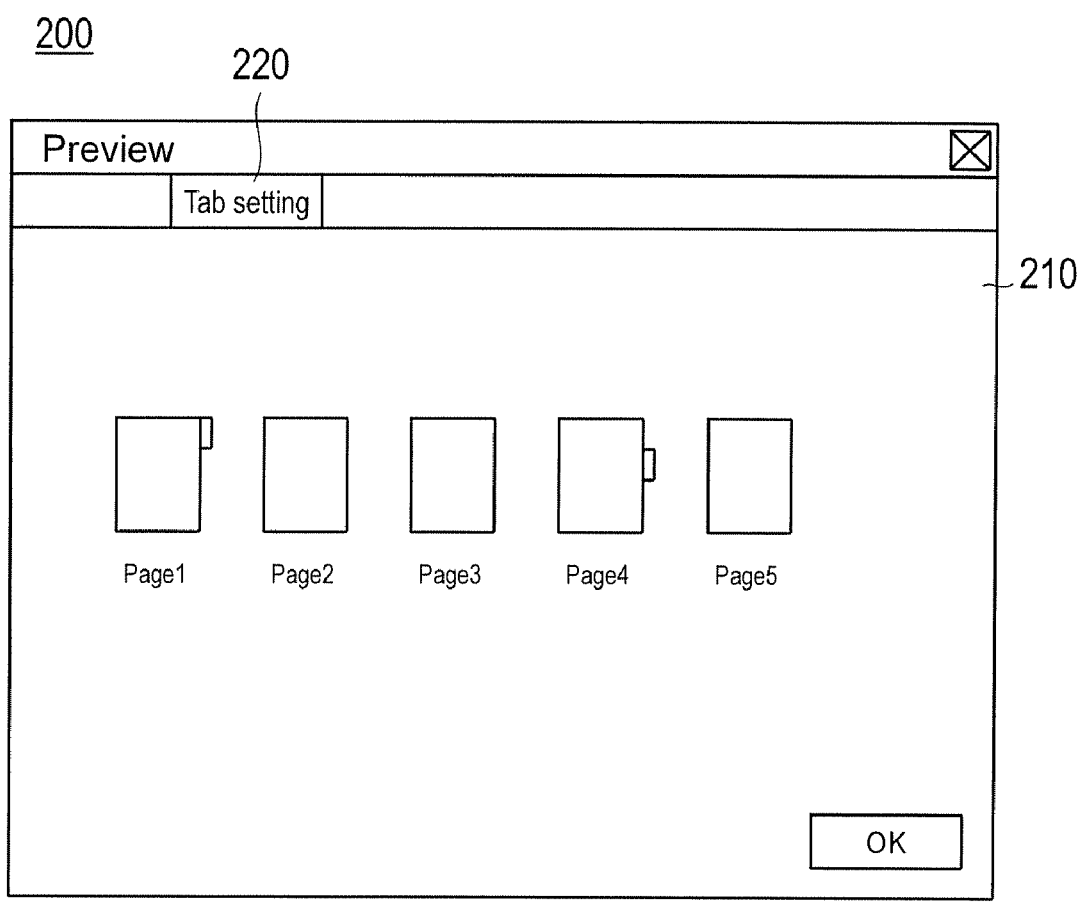
FIG. 8 is a diagram showing an example of a preview screen.

FIG. 8 is a diagram showing an example of a preview screen.

Figure 9:
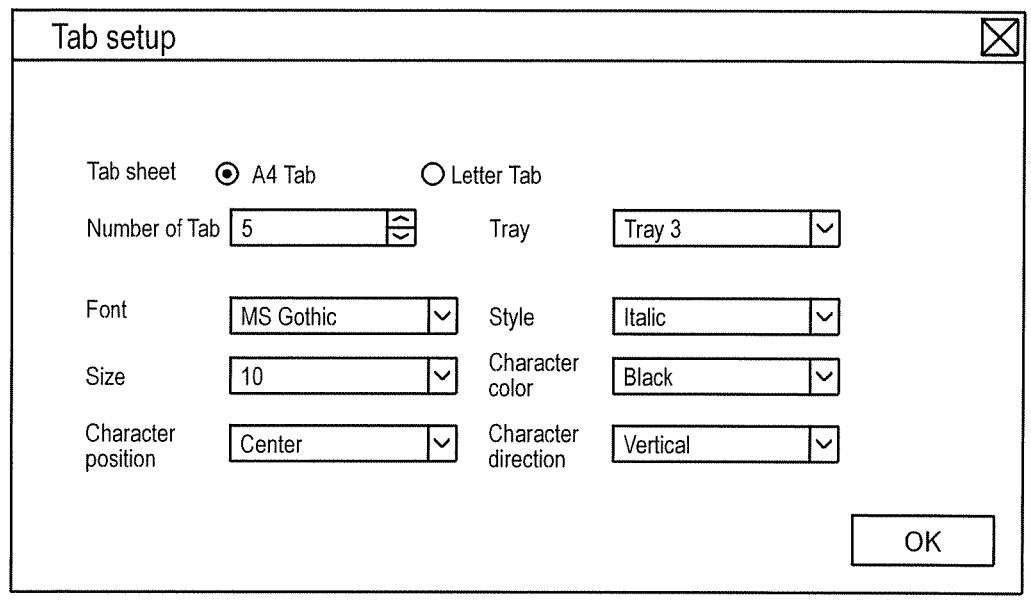
FIG. 9 is a diagram showing an example of a tab sheet screen.

A preview screen 200 has a preview part 210 which displays printing data of each page in the thumbnail image format, and a tab setting button 220 for displaying a setting screen concerning tab sheets for the selected printing data. When the tab setting button 220 is clicked, a tab setting screen 300 as shown in FIG. 9 is displayed on the display 25. The user can specify the size of a tab sheet, the tab number (number of tab), the sheet supply tray, and the characters to be printed on the tab of the tab sheet on the tab setting screen 300. In this case, the tab number (index number) is the number of tab sheets of one set whose tab positions are different, and it is also called as the index number. The specification concerning the characters to be printed on the tab sheet's tab includes at least one of the font, size, style, character's color, character's position and character's orientation.

Figure 10:
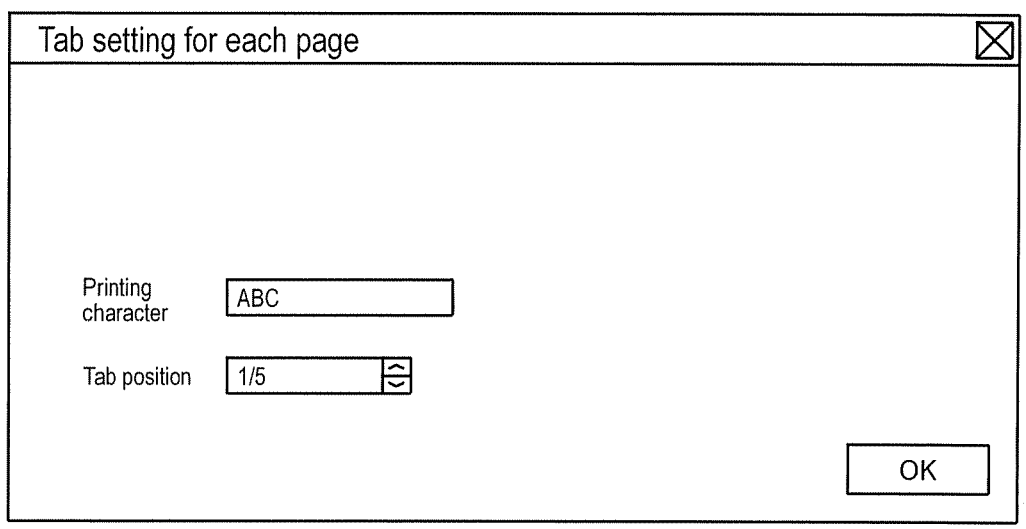
FIG. 10 is a diagram showing an example of a tab setting screen for each page.

Also, if the user wants to insert a tab sheet at a specific page, the user can specify the particular page on the preview screen 200 and specify the particular tab sheet to be inserted there. As the user right clicks (using the mouse) the thumbnail image of the page, at which the user wants to insert the tub sheet, among various thumbnail images displayed on the preview part 210, and clicks the command that says "the tab sheet is inserted before (or after) this page" from the displayed pull-down menu, the tab sheet's insertion to the specified page is set up. At this time, a page-by-page tab sheet setting screen 400 is displayed on the display 25 as shown in FIG. 10 for setting up the tab sheets page-by-page. The user can specify on the page-by-page tab sheet setting screen 400 the characters to be printed on the tab of the tab sheet to be inserted at the specified page position, and the tab position (e.g., ⅕) of the tab sheet inserted at the specified page position.

When the setting concerning the tab sheet is completed, the tab page which is the tab sheet page, is generated as the page data as a part of the printing data as shown in FIG. 8. The setting information concerning tab sheets is annexed to the particular printing data as an attachment table (refer to FIG. 14, etc.). Although the attachment table is added to the particular printing data, the relation requires only to be related to each other. When the printing instruction button (not shown) is clicked, the printing data added with the tab page is transferred to the printer 3, where the printer 3 prints the image based on the received printing data on the sheet supplied by the specified sheet supply tray. The image based on the tab page is printed on the sheet supplied by the specified sheet supply tray. However, the tab sheet can be inserted without any printing on the tab sheet as specified by the user.

Figure 11:
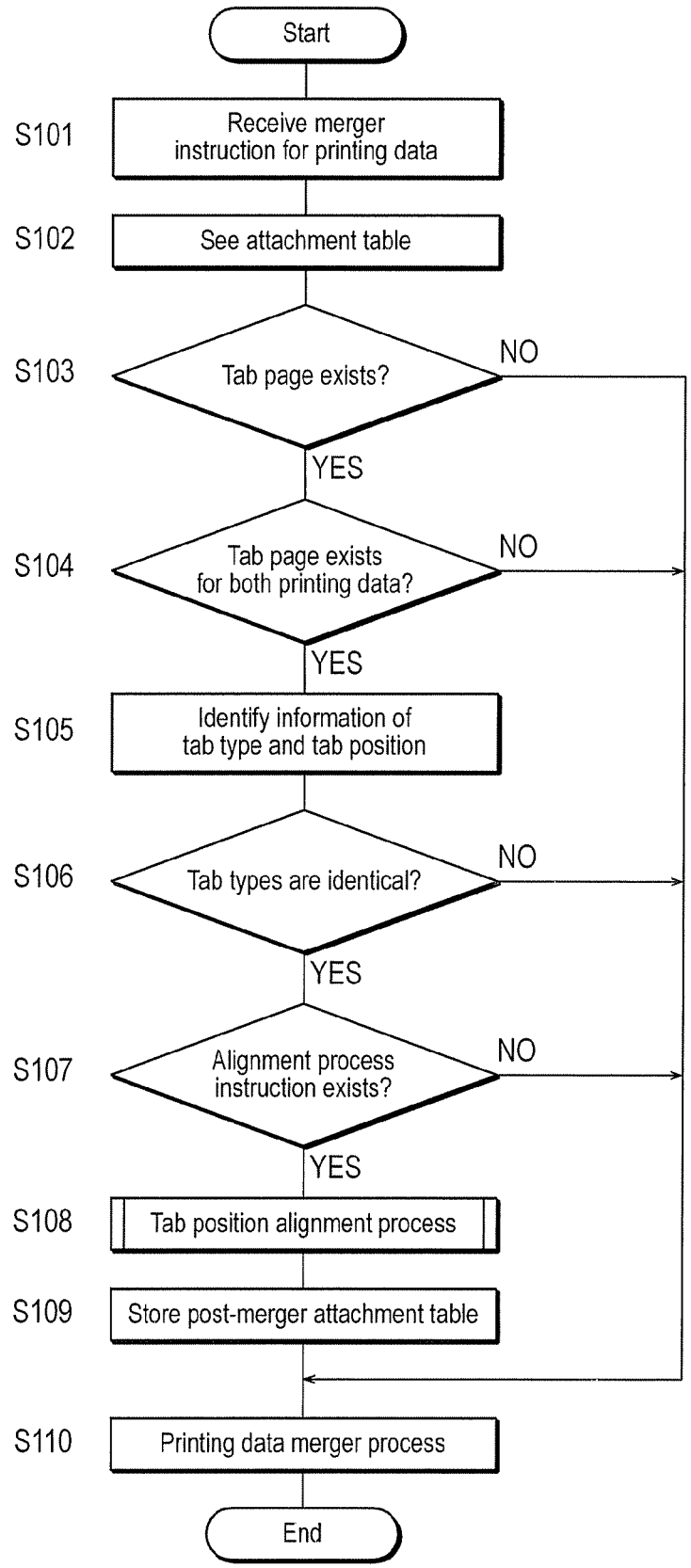
FIG. 11 is a flowchart showing the process sequence in the printer controller for merging printing data.
Figure 12:
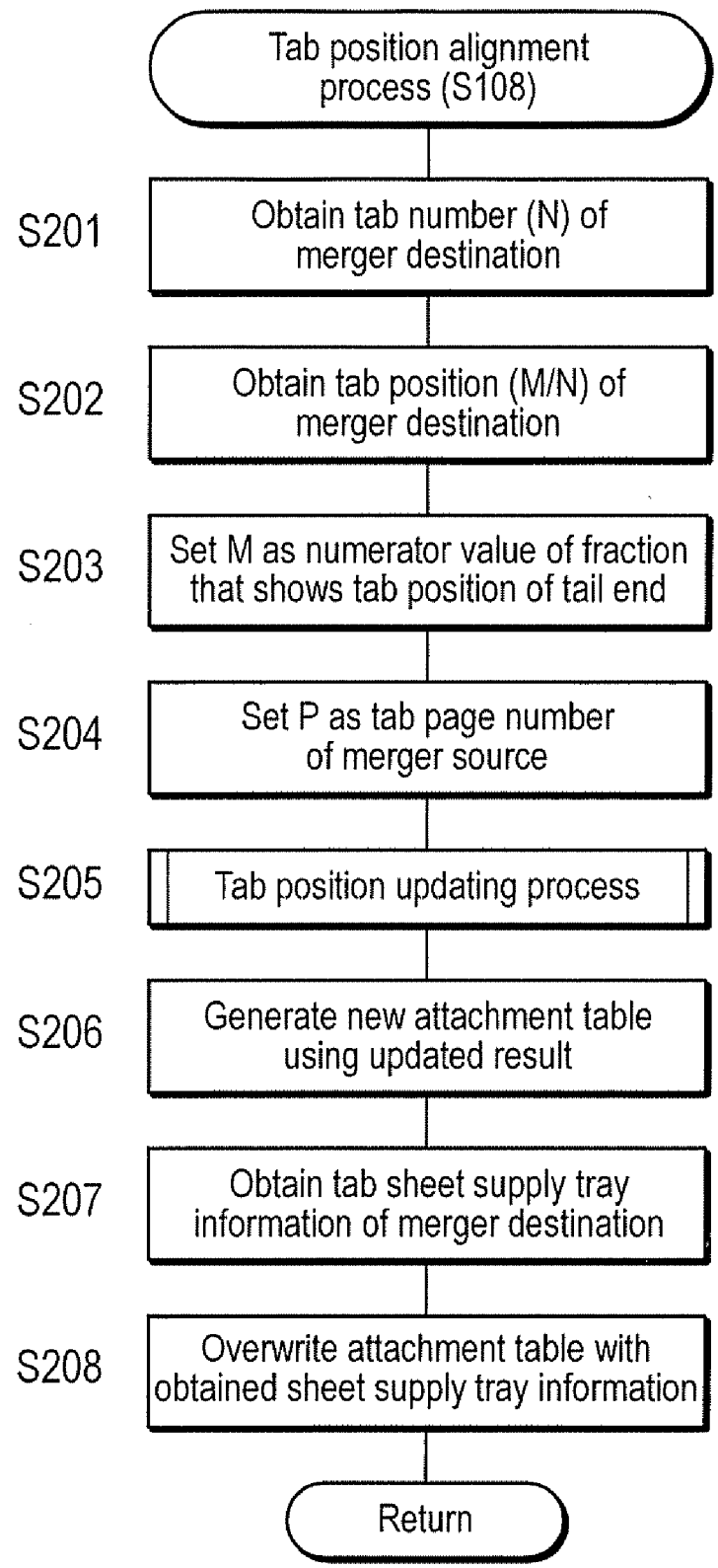
FIG. 12 is a flowchart showing the process sequence for alignment the tab positions.
Figure 13:
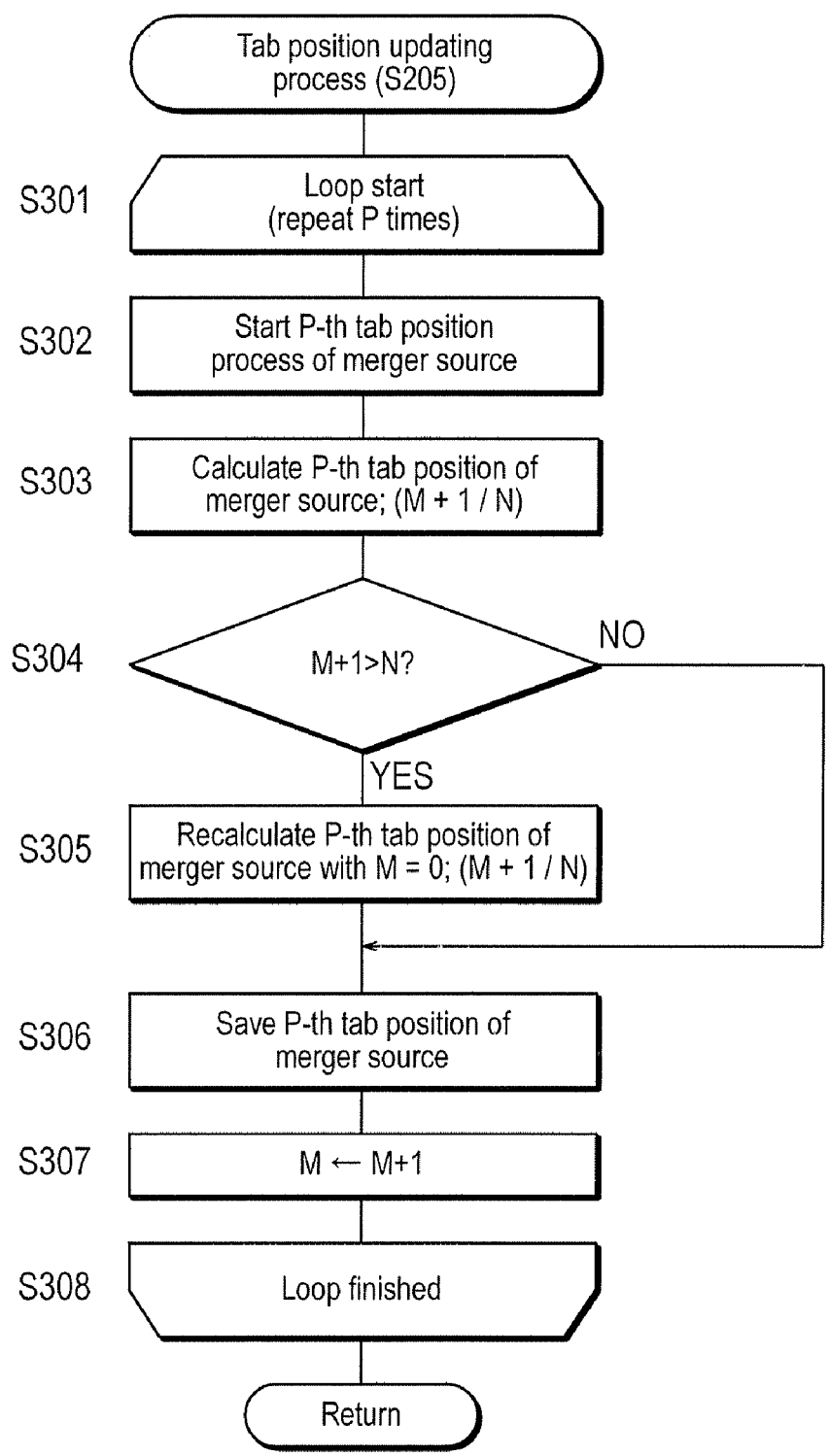
FIG. 13 is a flowchart showing the process sequence for updating the tab positions.

Next, the printing data merger process in the printer controller 2 will be described below referring to FIG. 11 through FIG. 13. The algorithm shown in the flowchart of FIG. 11 through FIG. 13 is stored as a program in a memory unit such as a hard disk 24 of the printer controller 2 and executed by the CPU 21.

First, the user's instruction for printing data merger is received (S101). When the merge button 120 is pressed by the user as the printing data of the merger destination is selected on the job list 100 shown in FIG. 7, a new window of a job list similar to the one on FIG. 7 is displayed on the display 25. When an OK button 130 is pressed by the user while the printing data of the merger source is selected, it is judged that the user's instruction for merging the printing data of the merger source with the printing data of the merger destination.

Next, the attachment tables of the printing data of the merger destination and the printing data of the merger source are referenced (S102). Here, the setting information concerning the tab sheets, i.e., the tab setting information of the merger destination and the tab setting information of the merger source are obtained.

FIG. 14 is a diagram showing an example of the attachment table of the merger destination, which is the attachment table concerning the printing data of the merger destination, and FIG. 15 is a diagram showing an example of the attachment table of the merger source, which is the attachment table concerning the printing data of the merger source.

A judgment is made in step S103 as to whether or not a tab page exists in the printing data specified for the merger. If there is no tab page in the printing data specified for the merger (S103: No), the program advances to step S110.

If it is judged that there is a tab page(s) in the printing data specified for the merger (S103: Yes), a judgment is made as to whether or not any tab page exists both in the printing data of the merger destination and the printing data of the merger source (S104). If there is no tab page in one of the printing data (S104: No), the program advances to step silo.

If it is judged that a tab page(s) exists in both printing data (S104: Yes), the type of tab sheet (tab type) and the tab position are identified (S105). The tab type consists of the size of the tab sheet and the tab number.

In step S106, a judgment is made as to whether the tab types of the two printing data are identical or not. If the tab types of the two printing data are different from each other (S106: No), the program goes to step S110.

If the tab type is the same for the two printing data (S106: Yes), a judgment is made as to whether there was an instruction by the user for executing a alignment process in order to align the tab positions of both of the printing data (S107). The alignment process of the tab positions is a process of changing the tab position in such a way that the tab positions vary sequentially from the start side of pages when two printing data are merged. At this point, a confirmation dialog 610 as shown in FIG. 16 is displayed on the display 25 prompting the user for an instruction whether or not to change the tab positions in order to make them line up. If there is no instruction from the user to perform an alignment process (S107: No), the program goes to step S110.

If it is judged that there was an instruction of the user to perform the alignment process (S107: Yes), the alignment process of the tab positions is performed (S108). Since it is so constituted as to enable the user to instruct whether to perform the alignment process or not, it is applicable to a case where the user wishes to honor the setting on the tab sheets in the printing data existed prior to the merger, thus making it possible to satisfy various requirements of the user. The detail for such a tab position alignment process will be discussed later.

Next, the post-merger attachment table generated as a result of the alignment process of the tab positions is stored in the memory unit such as the hard disk 24 (S109). The post-merger attachment table is an attachment table to be annexed to the post-merger printing data obtained by merging the two printing data.

FIG. 17 is an example of post-merger attachment table, which is an attachment table concerning post-merger printing data. A post-merger attachment table 730 shown in FIG. 17 is obtained when an alignment process is performed after merging the printing data of the merger destination equipped with an attaching table 710 of the merger destination shown in FIG. 14 with the printing data of the merger source equipped with an attaching table 720 of the merger source shown in FIG. 15. It can be seen from FIG. 17 that the tab positions in the printing data of the merger source are varied in such a way that the tab positions sequentially change from the start side of pages when the two printing data are merged.

In step S110, the printing data merger process is executed in order to merge the printing data of the merger destination with the printing data of the merger source to generate the post-merger printing data. The post-merger attachment table stored in step S109 is annexed here to the post-merger printing data.

The case when it is judged in step S106 that the tab types of the two printing data are different from each other (S106: No) will be described below. FIG. 18 is another example of merger source attachment table, which is an attachment table concerning printing data of merger sources. If the merger destination attachment table referenced in step S102 is the one shown in FIG. 14, and the merger source attachment table is the one shown n FIG. 18, the merger process for the two printing data is performed without executing the tab position alignment process in the present embodiment. In this case, none of the tab positions of the two printing data is changed. FIG. 19 is another example of post-merger attachment table, which is an attachment table concerning post-merger printing data. A post-merger attachment table 731 shown in FIG. 19 is obtained when the printing data of the merger destination equipped with an attaching table 710 of the merger destination shown in FIG. 14 is merged with the printing data of the merger source equipped with an attaching table 721 of the merger source shown in FIG. 18.

Let us now describe the sequence of the tab position alignment process (S108) with reference to FIG. 12 and FIG. 13. The following description is about the case when the merger process is executed in such a way that the printing data of the merger destination equipped with the merger destination attachment table shown in FIG. 14 is located on the leading edge, and the printing data of the merger source equipped with the merger source attachment table shown in FIG. 15 is located on the trailing end.

First, the tab number (N) of the printing data of the merger destination is obtained (S201). Here, N=5 is obtained. Also, the tab position (M/N) of the printing data of the merger destination is obtained (S202). Here, M/N=$\frac{1}{5}$, $\frac{2}{5}$, and $\frac{3}{5}$ are obtained.

Next, the numerator value of the fraction that represents the tail position among the tab positions of the printing data of the merger destination is set to the variable M (S203). Since M/N=$\frac{3}{5}$ for the last tab position, M=3 is set.

Next, the tab page number of the printing data of the merger source is set to P (S204). Here, P=3 is set.

In step S205, the tab position updating process is performed.

As shown in FIG. 13, the loop starts with the condition that it is repeated P times in the tab position updating process (S301). Here, P=3 (times).

Next, it starts the process for the P-th tab position of the merger source printing data (S302). The P-th tab position of the merger source printing data is calculated as (M+1)/N (S303). If P=1, the P-th tab position of the printing data of the merger source is calculated as (3+1)/5=$\frac{4}{5}$.

In step S304, a judgment id made as to whether M+1>N or not. In other words, it is checked whether it should go back to the leading tab position or not. If P=1, it is judged that M+1>N (3+1 (=4)>5 does not hold (S304: No). However, if P=3, it is judged that M+1>N (5+1 (=6)>5 holds (S304: Yes). If it is judged that M+1≦A (S304: No), the program advances to the step S306.

If it is judged that M+1>N (S304: Yes), let M=0 so that the position of the P-th tab of the merger source printing data is calculated again as (M+1)/N (S305).

In step S306, the P-th tab position of the merger source printing data calculated in step S303 or S305 is stored in the memory unit such as the RAM 23.

Next, the M+1 value is set as M (S307). If it is judged in step S308 that P times loop repetitions have not been completed, the program returns to step S301, while if it is judged that P times loop repetitions have been completed, it returns to the flowchart of FIG. 12.

In step S206 of FIG. 12, a new attachment table is generated using the tab position updated in step S205.

Next, the tab sheet supply tray information of the printing data of the merger destination is obtained (S207), and the attachment table generated in step S206 is overwritten with the particular sheet supply tray information (S208). Such a constitution prevents situations that require warnings for lack of necessary tab sheets in the specified sheet supply tray, and ensures smooth tab sheet insertion operation.

When merging the printing data of the merger destination with the printing data of the merger source in the first embodiment described above, the tab sheet setting information is identified from both printing data, and the tab positions can be changed and aligned in such a way that the tab positions vary sequentially from the start side of pages.

Thus, the user does not have to do any resetting as to tab sheets when a plurality of printing data including tab pages is to be merged. This brings the manpower saving in the printing data merger operation and enhances the user's benefits.

Next, the second embodiment will be described below focusing primarily on the differences from the first embodiment. Descriptions of those points having commonalities with the first embodiment will be skipped.

Figure 20:
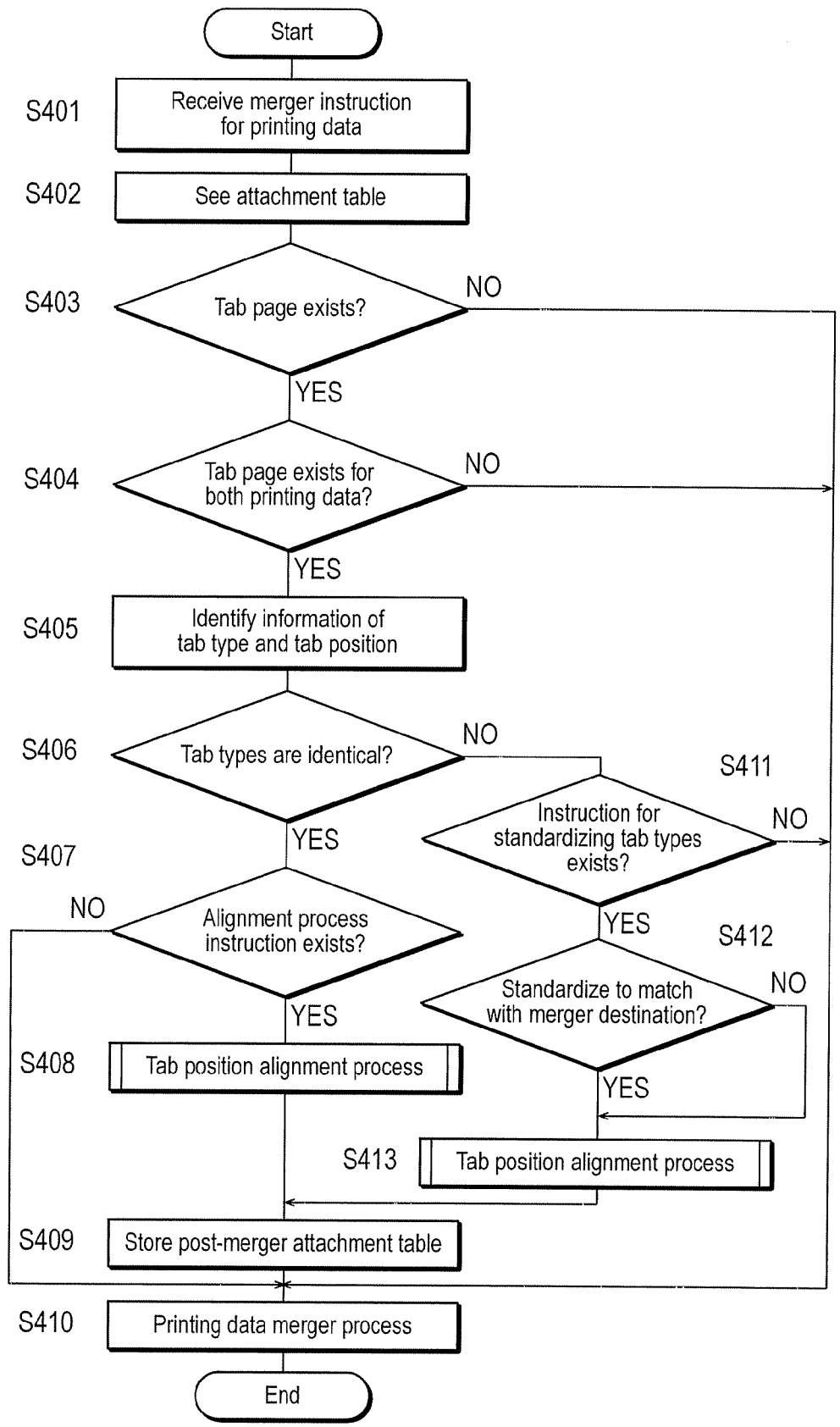
FIG. 20 is a flowchart showing the process for merging printing data on a printer controller according to the second embodiment of the invention.

FIG. 20 is a flowchart showing the process for merging printing data on a printer controller 2 according to the second embodiment of the invention. The algorithm shown in the flowchart of FIG. 20 is stored as a program in a memory unit such as a hard disk 24 of the printer controller 2 and executed by the CPU 21.

Since the steps S401 through S410 are identical to the steps S101 through S110 shown in FIG. 11, their descriptions are omitted.

If it is judged that the tab types of the two printing data are different in step S406 (S406: No) in the present embodiment, a judgment is made as to whether there was any instruction from the user for standardizing the tab type or not (S411). At this point, a confirmation dialog 620 as shown in FIG. 21 is displayed on the display 25 for prompting the user's instruction for standardizing the tab type. If there is no instruction from the user to standardize the tab type (S411: No), the program goes to step S410.

If there is an instruction from the user for standardizing the tab type (S411: Yes), a judgment is made as to whether there was any instruction from the user to use the tab type of the printing data of the merger destination as the standard (S412). At this point, a confirmation dialog 630 as shown in FIG. 22 is displayed on the display 25 for prompting the user's instruction for using the tab type of the printing data of the merger destination as the standard.

If it is judged in step S412 that there was an instruction from the user for using the tab type of the printing data of the merger destination as the standard (S412: Yes), the instruction information for using the tab type of the printing data of the merger destination as the standard is transmitted to the next step. On the other hand, If it is judged that there was an instruction from the user for not standardizing the tab type of the printing data of the merger destination (S412: No), the instruction information for standardizing the tab type of the printing data of the merger source is transmitted to the next step.

In step S413, the tab position alignment process is performed. The tab position alignment process in step S413 is similar to the tab position alignment process in step S108. However, the tab position alignment process in step S413 is different from the tab position alignment process in step S108 in that the tab type is standardized to the type specified by the user.

For example, if the merger destination attachment table referenced in step S402 is the one shown in FIG. 14, and the merger source attachment table is like the one in FIG. 18, and there was an instruction from the user for using the tab type of the printing data of the merger destination as the standard, the alignment process of the tab position is executed in the present embodiment. In this case, a post-merger attachment table shown in FIG. 17 is obtained.

As can be seen from the above, it is not only possible in the second embodiment to obtain the same effect as in the first embodiment but also the following effects.

In the second embodiment, the tab position alignment process is executed based on an instruction for standardizing the tab sheets is received from the user when the tab sheet types of the two printing data are different. Therefore, it has a flexibility of responding to a request of the user who wants to accomplish the tab position alignment process by standardizing the tab type, even if the tab sheet types of the two printing data are different.

Moreover, since it allows the user to select as to which of the two tab sheet types of the two printing data to be used, it further enhances the user's benefits.

Next, the third embodiment will be described below focusing primarily on the differences from the first embodiment. Descriptions of those points having commonalities with the first embodiment will be skipped.

In the alignment process of the setting information concerning the tab sheet, the tab position is changed in such a way as to vary sequentially starting from the start side of pages when the two printing data are merged in the first embodiment, while the tab character setting information is standardized to one of the two printing data.

Figure 23:
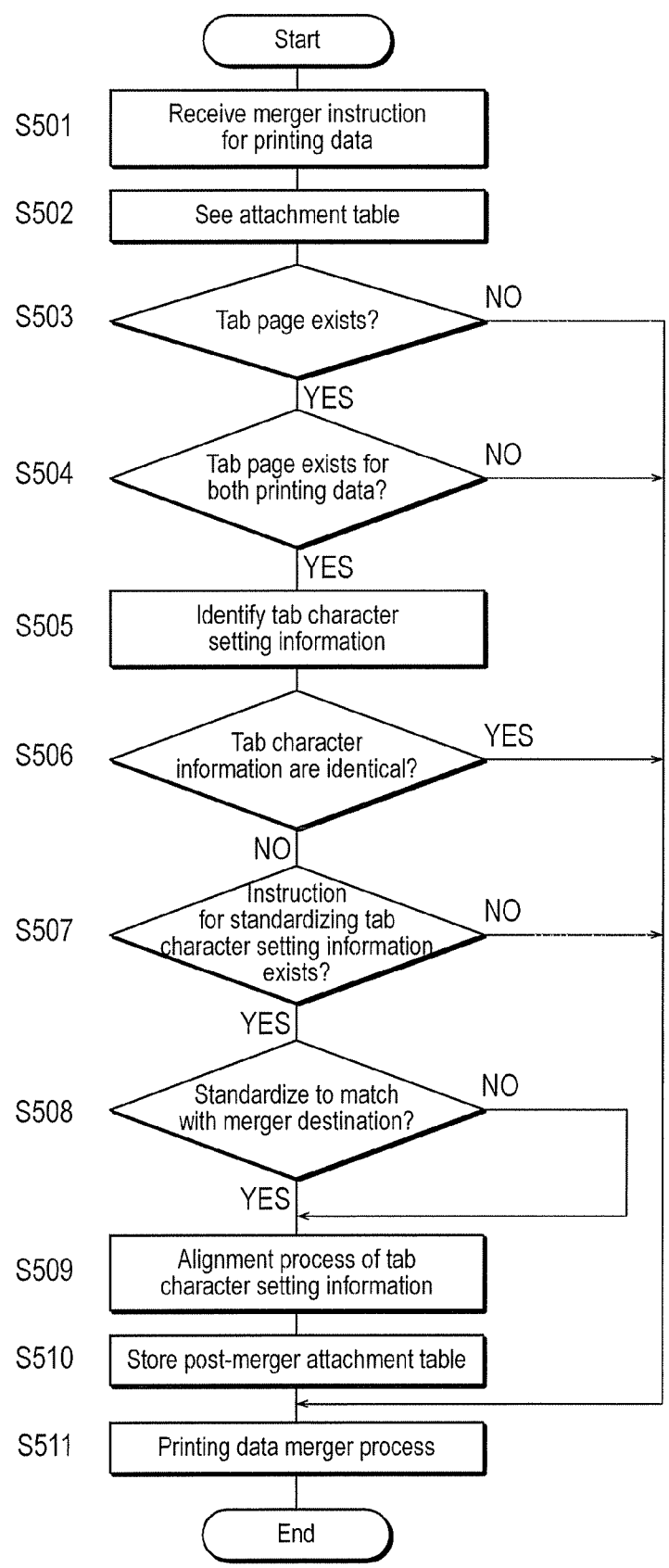
FIG. 23 is a flowchart showing the process for merging printing data on a printer controller according to the third embodiment of the invention.

FIG. 23 is a flowchart showing the process for merging printing data on a printer controller 2 according to the third embodiment of the invention. The algorithm shown in the flowchart of FIG. 23 is stored as a program in a memory unit such as a hard disk 24 of the printer controller 2 and executed by the CPU 21.

Since the steps S501 through S504 are identical to the steps S101 through S104 shown in FIG. 11, their descriptions are omitted.

However, for the sake of convenience of descriptions, the case of referencing the merger destination attachment table 710 as shown in FIG. 14 and the merger source attachment table 722 as shown in FIG. 24 in step S502 is described below.

In the present embodiment, tab character setting information, which is the setting information concerning the characters to be printed on the tabs of tab sheets, is identified in step S505. The tab character setting information here can be one that includes at least one of font, size, style, character color, character position and character orientation.

In step S506, a judgment is made as to whether the tab character setting information of the two printing data is identical or not. If the tab character setting information of the two printing data is identical (S506: Yes), the program goes to step S511.

If it is judged that the tab character setting information of the two printing data are different (S506: No), a judgment is made as to whether there was any instruction from the user for standardizing the tab character setting information or not (S507). At this point, a confirmation dialog 640 as shown in FIG. 25 is displayed on the display 25 for prompting the user's instruction for standardizing the tab character setting information. If there is no instruction from the user to standardize the tab type (S507: No), the program goes to step S511.

Figures 26, 27:
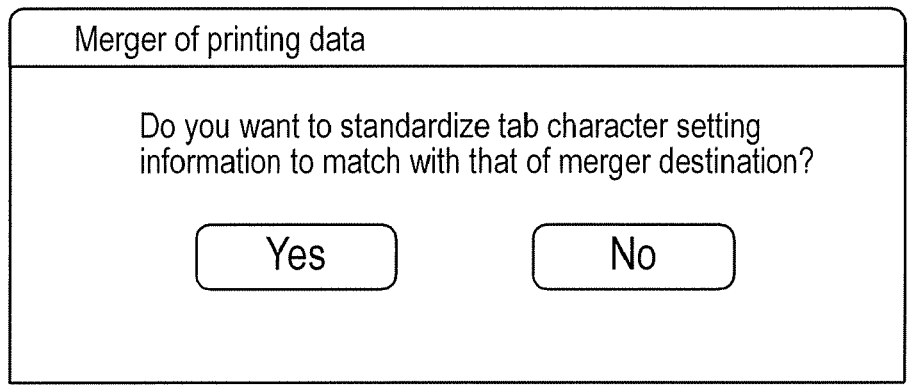
FIG. 26 is a diagram showing an example of a confirmation dialog.
FIG. 27 is an example of post-merger attachment table, which is an attachment table concerning post-merger printing data.

If there is an instruction from the user for standardizing the tab character setting information (S507: Yes), a judgment is made as to whether or not there was any instruction from the user for using the tab type of the printing data of the merger destination as the standard (S508). At this point, a confirmation dialog 650 as shown in FIG. 26 is displayed on the display 25 for prompting the user's instruction for using the tab character setting information of the printing data of the merger destination as the standard.

If it is judged that there was an instruction from the user for using the tab character setting information of the printing data of the merger destination as the standard (S508: Yes), the instruction information for using the tab character setting information of the printing data of the merger destination is transmitted to the next step. On the other hand, if it is judged that there was an instruction from the user for not using the tab character setting information of the printing data of the merger destination as the standard (S508: No), the instruction information for using the tab character setting information of the printing data of the merger source is transmitted to the next step.

In step S509, the tab alignment process of the tab character setting information is performed (S509). In other words, the tab character setting information is standardized to that of either one of the printing data.

Next, the post-merger attachment table generated as a result of the alignment process of the tab character setting information is stored in the memory unit such as the hard disk 24 (S510). The post-merger attachment table is an attachment table to be annexed to the post-merger printing data obtained by merging the two printing data.

FIG. 27 is an example of post-merger attachment table, which is an attachment table concerning post-merger printing data. A post-merger attachment table 732 shown in FIG. 27 is obtained when an alignment process is performed after merging the printing data of the merger destination equipped with an attaching table 710 of the merger destination shown in FIG. 14 with the printing data of the merger source equipped with an attaching table 722 of the merger source shown in FIG. 24. It can be seen from FIG. 27 that the tab character setting information in the printing data of the merger source is changed to be assimilated with the tab character setting information of the printing data of the merger destination.

In step S511, the printing data merger process is executed in order to merge the printing data of the merger destination with the printing data of the merger source to generate the post-merger printing data. The post-merger attachment table stored in step S510 is annexed here to the post-merger printing data.

When merging the printing data of the merger destination with the printing data of the printing source in the third embodiment described above, the tab character setting information is identified from both printing data, and the tab character setting information can be standardized to the tab character setting information of either one of the printing data.

Thus, the user does not have to do any resetting as to tab sheets when a plurality of printing data including tab pages is to be merged. This brings the manpower saving in the printing data merger operation and enhances the user's benefits.

It is obvious that this invention is not limited to the particular embodiments shown and described above but may be variously changed and modified without departing from the technical concept of this invention.

For example, if it is judged that there was an instruction from the user to standardize the tab type (S411: Yes), it can be automatically controlled to standardize it to match the tab type of the printing data of the merger destination. Moreover, if it is judged that there was an instruction from the user to standardize the tab character setting information (S507: Yes), it can be automatically controlled to standardize it to match the tab character setting information of the printing data of the merger destination. It is controlled in such a way because the printing data of the merger destination is considered as the master printing data, so that such a control suits the user's intention.

Furthermore, when one of the two printing data to be merged is stored in a printer which has a higher priority of use for outputs among a plurality of clustered printers, and the other printing data is stored in a printer of a lower priority of use for outputs, it makes it possible to automatically change the tab character setting information of the printing data stored in the printer of lower priority for outputs to match the tab character setting information of the printing data stored in the printer of higher priority for outputs. It is because the setting information of the printing data stored in the printer of higher priority for outputs should be prioritized as it is normally expected to be used when printing is made.

Although the setting information concerning the tab position is used in the firs and second embodiments, and the tab character setting information is used in the third embodiment as the setting information concerning the tab sheet, which is the target of the alignment process, the present invention is not limited to those formats. The present invention is applicable to a constitution where both the setting information concerning the tab position and the tab character setting information are used as the setting information concerning the tab sheet and the alignment processes for both of them are executed simultaneously.

Moreover, when there are tab sheets with different shapes of tabs, although the sizes and tab numbers are the same, and these tab sheets are treated as different sheets by assigning different names to them, it is possible to make a judgment in merging a plurality of printing data as to whether the tab sheets are of the same kind or not by comparing the names of the tab sheets contained in these printing data.

Although the printing data merging process was described using the application software installed in the printer controller 2 as an example in the embodiments described above, the present invention is not limited to such a format. The abovementioned application software can be, for example, installed in the printer 3. Also, the abovementioned application software can be such that uses the Web browser. Also, the abovementioned application software can be operated by a monitor or an operating panel attached to the printer controller 2 or the printer 3. Furthermore, the abovementioned application software can be executed on a PC by obtaining necessary information using HTTP or SNMP.

Also, although the above embodiments were described by assuming the printing data that is to be the target of the merger process, the present invention is not limited to it. The present invention is applicable to other type of data when the printing data that is to be the target of the merging process is other type of data such as PDL data.

Furthermore, although it is described in the above embodiment a constitution wherein the image forming apparatus 4 is divided into the printer controller 2 and the printer 3, both of which are locally connected, the printer controller 2 can be built into the printer 3.

Also, although a printer is used as the printing device in the above embodiments, the invention is not limited to it, but rather it can be an MFP (Multi-Function Peripheral), copying machine and the like.

The means and method of executing various processes in the image forming system according to the present invention can be materialized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the data processing apparatus as a part of its function.

What is claimed is:
1. A data processing apparatus, comprising:
 a merger instructing part for receiving a user's instruction for merger of first printing data with second printing data, the first printing data including first tab setting information and the second printing data including second tab setting information;
 an identifying part for identifying the first tab setting information and the second tab setting information, which are setting information concerning tab sheets, from said first printing data and said second printing data respectively, which are instructed to be merged via said merger instructing part; and an alignment processing part for processing alignment of said first tab setting information and said second tab setting information which are identified by said identifying part;

wherein said first tab setting information and said second tab setting information include setting information concerning tab positions that indicate positions of tabs in tab sheets; and said alignment processing part changes the tab positions in such a way that the tab positions vary sequentially from a start side of the pages, when said first printing data and said second printing data are merged.

2. The data processing apparatus as claimed in claim 1, further comprising an alignment instructing part for receiving a user's instruction as to whether said alignment processing is to be executed or not, and said alignment processing part changes tab positions in such a way that said tab positions vary sequentially from the start side of pages, when an instruction is received from said alignment instructing part for executing said alignment process.

3. The data processing apparatus as claimed in claim 2, wherein said alignment instructing part receives a user's instruction as to whether said alignment process is to be conducted or not, when tab sheet types of said first printing data and said second printing data are identical.

4. The data processing apparatus as claimed in claim 1, further comprising a tab type standardization instructing part for receiving a user's instruction for standardizing tab sheet types when the tab sheet types of said first printing data and said second printing data are different; and said alignment processing part changes tab positions in such a way that said tab positions vary sequentially from the start side of pages, when a user's instruction is received from said tab type standardization instructing part for standardizing tab sheet types.

5. The data processing apparatus as claimed in claim 4, further comprising a tab type selecting part for receiving a user's selection as to which of the tab sheet types, the tab sheet type of said first printing data or the tab sheet type of said second printing data, is to be used as the standard, when a user's instruction is received from said tab type standardization instructing part for standardizing the tab sheet type.

6. The data processing apparatus as claimed in claim 5, wherein between said first printing data and said second printing data, the setting information of the sheet supply tray, in which the tab sheet type that was not selected via said tab sheet selecting part is set up, is modified to conform to the setting information of the sheet supply tray, in which the tab sheet type that was selected via said tab sheet selecting part is set up.

7. The data processing apparatus as claimed in claim 1, wherein said first tab setting information and said second tab setting information include setting information concerning tab character setting information concerning characters to be printed on the tabs of the tab sheets; and said alignment processing part standardizes the tab character setting information in said first printing data and the tab character setting information in said second printing data to either one of them.

8. The data processing apparatus as claimed in claim 7, wherein further comprising a tab character standardization instructing part for receiving a user's instruction for standardizing tab character setting information when the tab character setting information of said first printing data and said second printing data are different; and said standardization processing part standardizes the tab character setting information in said first printing data and the tab character setting information in said second printing data to either one of them, when a user's instruction is received from said tab character standardization instructing part for standardizing the tab character setting information.

9. The data processing apparatus as claimed in claim 8, further comprising a tab character selecting part for receiving a user's selection as to which of the tab character setting information, the tab character setting information of said first printing data or the tab character setting information of said second printing data, is to be used as the standard, when a user's instruction is received from said tab character standardization instructing part for standardizing the tab character setting information.

10. The data processing apparatus as claimed in claim 7, wherein said tab character setting information includes setting information concerning fonts of characters to be printed on the tabs of the tab sheets.

11. The data processing apparatus as claimed in claim 7, wherein said tab character setting information includes setting information concerning positions of characters to be printed on the tabs of the tab sheets.

12. The data processing apparatus as claimed in claim 1, wherein said alignment processing part changes the second tab setting information to match the first tab setting information, when said second printing data, which is a merger source, is merged to said first printing data, which is a merger destination.

13. The data processing apparatus as claimed in claim 1, wherein said alignment processing part changes the second tab setting information to match the first tab setting information, when said first printing data is stored for a printer with a higher priority of use for outputs among a plurality of printers clustered and said second printing data is stored for a printer with a lower priority of use for outputs among a plurality of printers clustered.

14. A nontransitory computer readable recording medium stored with a data processing program, said data processing program causing a computer to execute a process comprising:

(a) providing a merger instructing part for receiving a user's instruction for merger of first printing data with second printing data, the first printing data including first tab setting information and the second printing data including second tab setting information;

(b) identifying the first tab setting information and the second tab setting information, which are setting information concerning tab sheets, from said first printing data and said second printing data respectively, which are instructed to be merged in said step (a); and (c) processing alignment of said first tab setting information and said second tab setting information which are identified in said step (b), wherein said first tab setting information and said second tab setting information include setting information concerning tab positions that indicate positions of tab in tab sheets; and said alignment processing part changes the tab positions in such a way that the tab positions vary sequentially from the start side of pages, when said first printing data and said second printing data are merged.

15. The nontransitory computer readable recording medium as claimed in claim 14, wherein said first tab setting information and said second tab setting information include setting information concerning tab character setting information concerning characters to be printed on the tabs of the tab sheets; and the tab character setting information in said first printing data and the tab character setting information in said second printing data are standardized to either one of them in said step (c).

* * * * *